United States Patent
Shi et al.

(10) Patent No.: US 11,584,647 B2
(45) Date of Patent: Feb. 21, 2023

(54) PREPARATION PROCESS OF FOOD-GRADE POTASSIUM DIHYDROGEN PHOSPHATE

(71) Applicant: WENGFU DAZHOU CHEMICAL CO., LTD., Sichuan (CN)

(72) Inventors: Jia Shi, Sichuan (CN); Yong Fu, Sichuan (CN); Jun Zhang, Sichuan (CN); Hui Liu, Sichuan (CN); Qiang Zhao, Sichuan (CN); Yiliang Mo, Sichuan (CN)

(73) Assignee: WENGFU DAZHOU CHEMICAL CO., LTD., Sichuan (CN)

( * ) Notice: Subject to any disclaimer, the term of this patent is extended or adjusted under 35 U.S.C. 154(b) by 422 days.

(21) Appl. No.: 16/934,056

(22) Filed: Jul. 21, 2020

(65) Prior Publication Data
US 2021/0179429 A1    Jun. 17, 2021

(30) Foreign Application Priority Data

Dec. 16, 2019   (CN) .......................... 201911296226.X

(51) Int. Cl.
| | |
|---|---|
| C01B 25/30 | (2006.01) |
| A23L 33/16 | (2016.01) |
| B01D 1/00 | (2006.01) |
| B01D 21/26 | (2006.01) |
| B01F 27/191 | (2022.01) |
| B01F 27/1125 | (2022.01) |
| B01F 35/32 | (2022.01) |

(Continued)

(52) U.S. Cl.
CPC ............ *C01B 25/301* (2013.01); *A23L 33/16* (2016.08); *B01D 1/0041* (2013.01); *B01D 1/0088* (2013.01); *B01D 21/262* (2013.01); *B01F 27/1125* (2022.01); *B01F 27/191* (2022.01); *B01F 35/2115* (2022.01); *B01F 35/221422* (2022.01); *B01F 35/323* (2022.01); *A23V 2002/00* (2013.01); *B01F 35/331* (2022.01); *C01P 2006/80* (2013.01)

(58) Field of Classification Search
CPC .................................................... C01B 25/30
See application file for complete search history.

(56) References Cited

U.S. PATENT DOCUMENTS 3,615,184 A * 10/1971 Gehrig .................. C01B 25/301
                                                              159/17.3

FOREIGN PATENT DOCUMENTS

| CN | 105948011 A | * | 9/2016 |
| CN | 106082153 A | * | 11/2016 |

* cited by examiner

*Primary Examiner* — Anthony J Zimmer
*Assistant Examiner* — Logan Edward Laclair
(74) *Attorney, Agent, or Firm* — Yue (Robert) Xu; Apex Attorneys at Law, LLP

(57) ABSTRACT

The present invention discloses a preparation process of food-grade potassium dihydrogen phosphate, wherein phosphoric acid prepared from wet-process phosphoric acid is used for the preparation of high-purity potassium dihydrogen phosphate. The preparation process of food-grade potassium dihydrogen phosphate provided in the present invention effectively reduces the preparation cost of the high-purity potassium dihydrogen phosphate and has the advantage of high process controllability, and by such a process, high-purity potassium dihydrogen phosphate crystals that meet the food-grade requirements can be produced, which crystals have uniform particle size distribution and comprises few fine powder, having a very high market value.

7 Claims, 2 Drawing Sheets

(51) Int. Cl.
    *B01F 35/21*     (2022.01)
    *B01F 35/221*     (2022.01)
    *B01F 35/33*     (2022.01)

PREPARATION PROCESS OF FOOD-GRADE POTASSIUM DIHYDROGEN PHOSPHATE

CROSS REFERENCE TO RELATED APPLICATIONS

The present application claims priority to Chinese Patent Application No. 201911296226.X, titled "PREPARATION PROCESS OF FOOD-GRADE POTASSIUM DIHYDROGEN PHOSPHATE", filed on Dec. 16, 2019 with the State Intellectual Property Office of People's Republic of China, which is incorporated herein by reference in its entirety.

FIELD

The present invention relates to a preparation process of high-purity phosphate, and in particular to a preparation process of food-grade potassium dihydrogen phosphate.

BACKGROUND

Potassium dihydrogen phosphate is one of the important products in the phosphate industry and is widely used in modern industry, food, medicine, farming and animal husbandry, and other fields. Among them, high-purity potassium dihydrogen phosphate is an important raw material for manufacturing potassium metaphosphate, potassium pyrophosphate, other edible potassium salts, and medical potassium salts. Currently, the preparation process of potassium dihydrogen phosphate generally used includes mainly a neutralization method, a double decomposition method, etc.

In the neutralization method, potassium dihydrogen phosphate is generally prepared by a neutralization reaction using thermal-process phosphoric acid as a raw material. However, this method requires the use of the thermal-process phosphoric acid as the raw material, and the thermal-process phosphoric acid has a strict requirement on the phosphate ore resources. Therefore, although the purity of the phosphoric acid prepared is relatively high, the cost thereof is relatively high. Further, the neutralization reaction of the wet-process phosphoric acid widely used in China currently is not easy to control, and other impurities are easily introduced, resulting in degradation of the purity, which cannot meet requirements for the use of high-purity phosphate such as industrial-grade potassium dihydrogen phosphate and food-grade potassium dihydrogen phosphate.

SUMMARY

In order to solve the above technical problems, a technical solution provided in the present invention provides a preparation process of food-grade potassium dihydrogen phosphate, which process has the advantages of high process controllability and a high phosphoric acid utilization rate, and by which process potassium dihydrogen phosphate crystals that meet the food-grade requirements can be produced, with the crystals having uniform particle size distribution and having a very high market value.

In view of this, a preparation process of food-grade potassium dihydrogen phosphate disclosed in the present application comprises:

feeding phosphoric acid and a potassium hydroxide solution into a neutralization reactor for a neutralization reaction to obtain a potassium dihydrogen phosphate solution;

cooling the potassium dihydrogen phosphate solution to 40-45° C. to obtain a potassium dihydrogen phosphate suspension;

separating the potassium dihydrogen phosphate suspension to obtain a liquid phase and a solid phase;

feeding the liquid phase to a concentration system for concentration and then feeding to the neutralization reactor (1);

drying the solid phase to obtain potassium dihydrogen phosphate crystals.

Preferably, the step of reaction to obtain a potassium dihydrogen phosphate solution comprises:

heating the phosphoric acid with a concentration of not less than 85% to 100-105° C.;

feeding the heated phosphoric acid into the neutralization reactor (1) and feeding a potassium hydroxide solution with a concentration of 48-50% continuously at a constant speed into the neutralization reactor (1), in which the phosphoric acid is fully reacted with the potassium hydroxide under continuous stirring to obtain the potassium dihydrogen phosphate solution.

Preferably, the step to obtain a potassium dihydrogen phosphate suspension comprises:

cooling the potassium dihydrogen phosphate solution to 40-45° C. at a speed of 0.3-0.45° C./min in the neutralization reactor (1) by continuously stirring the potassium dihydrogen phosphate solution therein to obtain the potassium dihydrogen phosphate suspension.

Preferably, a stirring device is provided in the neutralization reactor (1), and a two-stage stirring blade (13) is at least arranged along an axial direction on a stirring shaft of the stirring device.

Preferably, the stirring device is connected to a variable-frequency drive device (11), and the neutralization reactor (1) is provided with a temperature detection device (12), with the variable-frequency drive device (11) being electrically connected to the temperature detection device (12), wherein the temperature detection device (12) is used for detecting the real-time temperature change of the neutralized solution within the neutralization reactor (1), and the variable-frequency drive device (11) is used for adjusting the stirring speed depending on the detection result of the temperature detection device (12), such that the temperature of the solution within the neutralization reactor (1) is 85-100° C.

Preferably, the potassium dihydrogen phosphate suspension is separated into the liquid phase and the solid phase by a centrifuge (2), in which centrifuge a steam pipeline (21) for introducing a saturated steam into the centrifuge (2) and a potassium hydroxide solution pipeline (22) for introducing a potassium hydroxide solution with a concentration of 48-50% into the centrifuge (2) are provided, and on which centrifuge a discharge pipeline is further provided.

Preferably, the concentration system comprises a first evaporation chamber (41), a second evaporation chamber (42) and a third evaporation chamber (43), wherein a shell side of the first evaporation chamber (41) is connected with a first steam pipeline, a shell side of the second evaporation chamber (42) and a shell side of the third evaporation chamber (43) are connected in series with a second steam pipeline.

Preferably, the liquid phase is heated and evaporated in the first evaporation chamber (41), the second evaporation chamber (42) and the third evaporation chamber (43) in sequence, such that the liquid phase with a density of 1.3 to 1.5 g/mL at normal temperature and pressure is concentrated to a mixed solution having specific gravity of 1.5-1.55 g/mL, 1.55-1.58 g/mL and 1.58-1.63 g/mL respectively.

Preferably, a steam introduced by the first steam pipeline is used for heating the first evaporation chamber (41) to 100-110° C., a steam introduced within the second evaporation chamber (42) heats the second evaporation chamber (42) to 80-90° C., and a steam introduced within the third evaporation chamber (43) heats the third evaporation chamber (43) to 65-75° C.

Preferably, a filter device (44) is provided at each discharge port of the first evaporation chamber (41), the second evaporation chamber (42) and the third evaporation chamber (43).

The present application will be described in detail compared with the prior art hereinafter.

The present application discloses a preparation process of food-grade phosphate, in which a process of preparing high-purity potassium dihydrogen phosphate by a neutralization method of wet-process phosphoric acid can be achieved using wet-process phosphoric acid as a raw material to be subjected to a neutralization reaction with potassium hydroxide and by using the reaction heat and controlling the points of the cooling and crystallization.

Further, with this system, phosphoric acid is preheated, which combined with the reaction heat of the reaction between the phosphoric acid and the potassium hydroxide, results in that during the stirring for the reaction of the potassium dihydrogen phosphate, the concentration of the potassium dihydrogen phosphate is always lower than that of the potassium dihydrogen phosphate saturated solution at this temperature, such that always no crystal precipitates during the neutralization reaction, which effectively improves the quality of the crystals.

In addition, with the process, the crystal precipitation speed by cooling is further controlled. In the cooling stage, the temperature change inside the neutralization reactor (1) can be obtained according to the detection result of the temperature detection device (12). Due to the presence of variables such as the moisture volatilization, concentration change and crystal density change during the cooling and crystallization process of the potassium dihydrogen phosphate solution, and the specific heat capacity of the potassium dihydrogen phosphate suspension is also constantly changed, the rotational speed of the variable-frequency drive device (11) is flexibly adjusted according to the temperature change, such that the potassium dihydrogen phosphate solution is cooled at a stable speed. The prepared crystals have good product appearance and meet the requirements on the control of crystal size and fine particles for the food-grade potassium dihydrogen phosphate.

Both the first evaporation chamber and the second evaporation chamber of the present application are directly introduced with a high-temperature heat source steam, which can avoid problems due to the dilution of the liquid phase, such as a low evaporation speed of the liquid phase, low evaporation efficiency thereof, and failure to be discharged in time, thereby ensuring the stable operation of the system.

DETAILED DESCRIPTION

Figure 1:
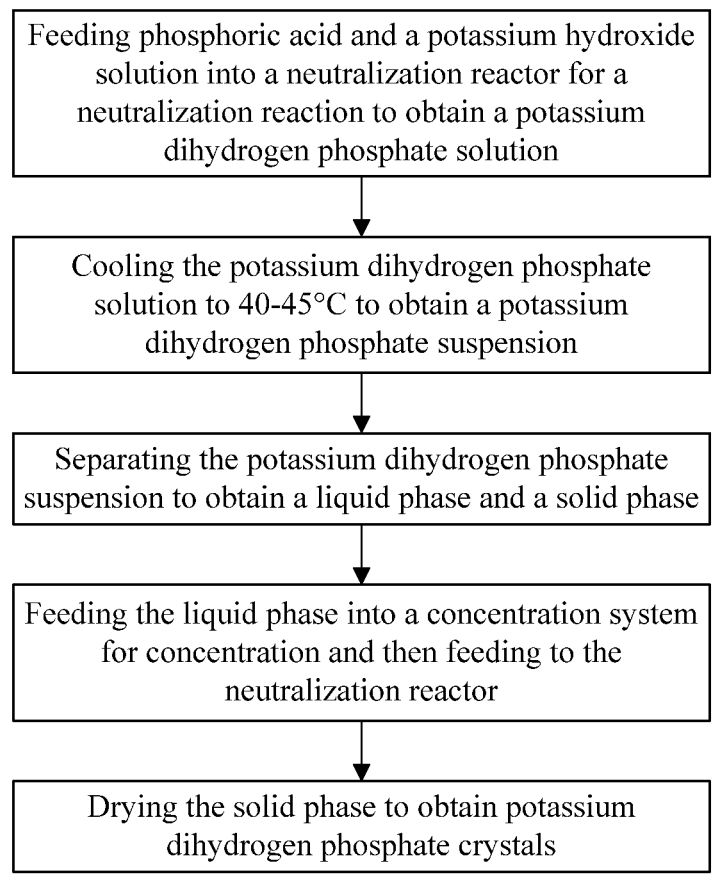
FIG. 1 is a flow diagram of the process of the present application.
Figure 2:
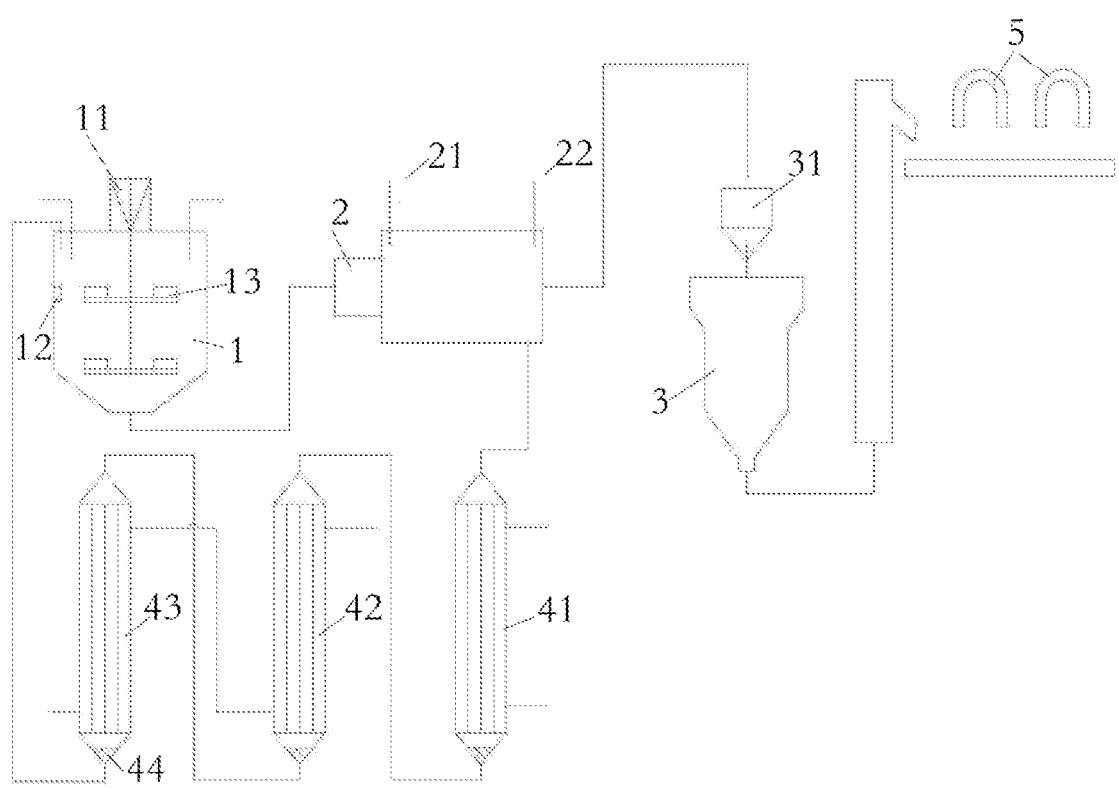
FIG. 2 is a flow diagram of a system applying the process of the present application.

In order to enable those skilled in the art to understand the technical solutions of the present invention better, the present invention will be further described in detail in conjunction with the drawings and specific embodiments below.

As shown in the figures, the present application discloses a preparation process of potassium dihydrogen phosphate, comprising the steps of:

feeding phosphoric acid with a concentration of not less than 85% and a potassium hydroxide solution into a neutralization reactor (1) to obtain a potassium dihydrogen phosphate solution;

cooling the potassium dihydrogen phosphate solution to 40-45° C. to obtain a potassium dihydrogen phosphate suspension;

feeding the potassium dihydrogen phosphate suspension into a centrifuge (2) for centrifugal separation to obtain a liquid phase and a solid phase, wherein the liquid phase is fed to the neutralization reactor (1) after the liquid phase is fed to the concentration system for concentration and subjected to pH adjustment; and the solid phase is fed to a fluidized bed (3) and dried to obtain potassium dihydrogen phosphate crystals.

Herein, both the solid phase and the liquid phase described in the present application should be interpreted as a mixture containing a solid and a liquid, wherein the solid phase refers to solid particulates mixed with a small amount of a liquid; the liquid phase refers to a liquid mixed with a small amount of suspended potassium dihydrogen phosphate crystals.

The preparation process of potassium dihydrogen phosphate disclosed in the present application specifically comprises:

heating phosphoric acid with a concentration of not less than 85% to 100° C., feeding the heated phosphoric acid into a neutralization reactor (1), and feeding a potassium hydroxide solution with a concentration of 48-50% continuously at a constant speed into the neutralization reactor (1), in which the phosphoric acid is fully reacted with the potassium hydroxide under continuous stirring to obtain a potassium dihydrogen phosphate solution;

cooling the potassium dihydrogen phosphate solution to 40-45° C. by continuously stirring the potassium dihydrogen phosphate solution in the neutralization reactor (1) to obtain a potassium dihydrogen phosphate suspension;

feeding the potassium dihydrogen phosphate suspension into a centrifuge (2) for centrifugal separation to obtain a liquid phase and a solid phase;

feeding the solid phase through a distribution device to a fluidized bed (3) which is used for drying the solid phase to obtain potassium dihydrogen phosphate crystals;

feeding the liquid phase to the concentration system to concentrate the liquid phase to a saturated solution, adjusting the pH value of the liquid phase and feeding to the neutralization reactor (1).

With the neutralization reactor (1) described in the present application, by preheating the phosphoric acid during the reaction process, the solubility of the potassium dihydrogen phosphate in water is improved, which combining with the reaction heat of the reaction between the phosphoric acid and the potassium hydroxide, results in that during the stirring for the reaction of the potassium dihydrogen phosphate, the concentration of the potassium dihydrogen phosphate is always lower than that of the potassium dihydrogen phosphate saturated solution at this temperature. Since it is necessary to avoid the reduction of the solubility of the potassium dihydrogen phosphate caused by excessively fast heat dissipation due to excessive stirring, a speed-controllable stirring device is provided in the neutralization reactor (1) of the present application.

The stirring device comprises a stirring shaft which is connected with a variable-frequency drive device (11), and on which a multi-stage stirring blade (13) is provided along the axial direction.

The stirring blade (13) is a multi-stage stirring blade (13), which can stir the liquid at different liquid level depths in the neutralization reactor (1), thereby ensuring that the reaction is effective and sufficient. If the local concentration of the potassium dihydrogen phosphate is excessively high due to insufficient stirring or the temperature is decreased due to the local unbalanced reaction heat, suspended crystals would be formed within the neutralization reactor (1), which would destroy the morphology of the potassium dihydrogen phosphate crystals and degrade the quality of the product.

In addition, the variable-frequency drive device (11) of the present application is connected with a control device, and the neutralization reactor (1) is provided with a temperature detection device (12). The temperature detection device (12) is used for detecting the real-time temperature change of the neutralized solution within the neutralization reactor (1), and the variable-frequency drive device (11) is used for adjusting the stirring speed depending on the detection result of the temperature detection device (12), thereby adjusting the temperature change of the neutralized solution within the neutralization reactor (1), and ensuring that the temperature inside the neutralization reactor (1) is maintained at 85-100° C. Depending on the temperature change, such as the real-time temperature parameter, the variable-frequency drive device (11) can adjust the rotational speed to reduce the heat loss caused by the stirring device in the neutralization reactor (1) and keep the reactor constantly at 85-100° C.

At this temperature, the potassium dihydrogen phosphate has a relatively high solubility in the neutralization reactor (1), which ensures that the potassium dihydrogen phosphate generated by the neutralization reaction is always effectively dissolved in an unsaturated state.

When it is necessary to stop the reaction in the neutralization reactor (1), the phosphoric acid and the potassium hydroxide are stopped to be fed, and the potassium dihydrogen phosphate solution is continuously stirred at a rotational speed of 120-148 r/min in the neutralization reactor (1), such that the potassium dihydrogen phosphate solution is cooled at a speed of 0.3-0.45° C./min in the reactor. When the potassium dihydrogen phosphate solution is cooled to 40-45° C., stirring is stopped and the potassium dihydrogen phosphate suspension is obtained. At this time, since the potassium dihydrogen phosphate solution is cooled down, the solubility of the potassium dihydrogen phosphate is decreased and crystals precipitate, forming the potassium dihydrogen phosphate suspension. At this stirring speed, the crystals can be effectively and uniformly dispersed in the suspension, and as the degree of saturation of the potassium dihydrogen phosphate decreases, the potassium dihydrogen phosphate suspension having good crystal morphology distribution can be formed.

In this cooling and crystallization stage, the temperature change inside the neutralization reactor (1) can be obtained according to the detection result of the temperature detection device (12). Due to the presence of variables such as the moisture volatilization, concentration change and crystal density change during the cooling and crystallization process of the potassium dihydrogen phosphate solution, and the specific heat capacity of the potassium dihydrogen phosphate suspension is also constantly changed, the rotational speed of the variable-frequency drive device (11) is flexibly adjusted according to the temperature change, such that the potassium dihydrogen phosphate solution is always cooled at a speed of 0.3-0.45° C./min. Analysis on the crystals generated by this process by experiments shows that, 90% of the potassium dihydrogen phosphate crystals formed by this process have a crystal size of 1.5-1.8 mm, which have good product appearance and meet the requirements on the control of crystal size and fine particles for the food-grade potassium dihydrogen phosphate. The percentages of crystal sizes of the products obtained at different temperatures are shown hereinafter:

| Crystal size of the | Temperature of the suspension (° C.) | | | | |
|---|---|---|---|---|---|
| product(mm) | 38 | 40 | 42 | 45 | 47 |
| <1.5 | 4% | 4% | 5% | 7% | 10% |
| 1.5--1.8 | 84% | 88% | 91% | 89% | 86% |
| >1.8 | 12% | 8% | 4% | 4% | 4% |

The mass of the products obtained by subjecting 500 mL monopotassium phosphate suspension to filtration and drying is shown hereinafter:

| | Temperature of the suspension (° C.) | | | | |
|---|---|---|---|---|---|
| | 38 | 40 | 42 | 45 | 47 |
| Mass of the product (g) | 225 | 248 | 257 | 253 | 223 |

The potassium dihydrogen phosphate suspension is fed into the centrifuge (2) for separation to obtain a solid phase and a liquid phase, wherein the solid phase is fed to the fluidized bed (3), and the liquid phase is fed to the concentration system.

A steam pipeline (21) and a potassium hydroxide solution pipeline (22) are led to the centrifuge (2), and a discharge pipeline connected to the concentration system is further provided on the centrifuge (2).

The steam pipeline (21) is used to introduce a saturated steam into the centrifuge (2). The saturated steam heats the accumulated materials in the centrifuge (2), which can improve the the solubility of the accumulated materials in water while the saturated steam liquefies upon cooling, thus achieving the effect of cleaning the centrifuge (2). In addition, the potassium hydroxide solution pipeline (22) is used to introduce the potassium hydroxide solution into the centrifuge (2), which combined with the heating effect of the steam, can dissolve the acidic accumulated materials which are insoluble within the centrifuge (2), and the cleaned liquid is fed through the discharge pipeline into the concentration system for recycling.

A vibrating distributor (31) is provided on the top of the fluidized bed (3), and a vibrating motor to realize the vibratory unloading of the distributor is provided in the vibrating distributor (31). Since the solid phase introduced to the fluidized bed (3) in the present application is a wet crystalline mixture containing a small amount of the liquid, the fluidity is poor, and in order to avoid local uneven heating or local fluidized recrystallization due to the material accumulation, uniform distribution is achieved by the vibrating distributor (31).

The liquid phase is introduced to the concentration system, and is heated and concentrated by a steam. In addition, the cleaned liquid discharged from the centrifuge (2) via the discharge pipeline is also introduced to the concentration system, and is mixed with the liquid phase and heated and concentrated by the steam.

The concentration system comprises a first evaporation chamber (41), a second evaporation chamber (42) and a third evaporation chamber (43), wherein a shell side of the first evaporation chamber (41) is connected with a first steam pipeline, a shell side of the second evaporation chamber (42) and a shell side of the third evaporation chamber (43) are connected in series with a second steam pipeline. Specifically, a second steam inlet and a second steam outlet are provided in the second evaporation chamber (42), wherein the second steam outlet is connected to a third steam inlet of the third evaporation chamber (43), the second steam pipeline is fed through the second steam inlet, and is used for heating and concentration of the second evaporation chamber (42) and the third evaporation chamber (43) in sequence.

The steam introduced by the first steam pipeline is used to heat the first evaporation chamber (41) to 100-110° C., the steam introduced within the second evaporation chamber (42) heats the second evaporation chamber (42) to 80-90° C., and the recovered steam introduced within the third evaporation chamber (43) heats the third evaporation chamber (43) to 65-75° C. The liquid phase is heated and evaporated in the first evaporation chamber (41), the second evaporation chamber (42) and the third evaporation chamber (43) in sequence, such that the liquid phase with a density of 1.3-1.5 g/mL at normal temperature and pressure is concentrated to a mixed solution having specific gravity of 1.5-1.55 g/mL, 1.55-1.58 g/mL and 1.58-1.63 g/mL respectively. With this concentration system, the moisture is evaporated from the liquid phase and impurities are removed therefrom, and then the liquid phase is returned to the neutralization reactor (1).

The first evaporation chamber (41) and the second evaporation chamber (42) are directly introduced with a heat source steam which has a temperature higher than the boiling temperature of the liquid phase, such that the liquid phase within each of the first evaporation chamber (41) and the second evaporation chamber (42) is always in a boiling state. In such a state, the moisture in the liquid phase is quickly volatilized, the liquid phase is rapidly concentrated, and the efficiency for the recovery of the liquid phase is improved. In addition, because the saturated steam or the potassium hydroxide solution in the centrifuge (2) is recycled in the present application, the liquid phase within the first evaporation chamber (41) is further diluted by the water formed from the liquefaction of the steam and the water in the potassium hydroxide solution. However, both the first evaporation chamber (41) and the second evaporation chamber (42) of the present application are directly introduced with a high-temperature heat source steam, which can avoid problems due to the dilution of the liquid phase, such as a low evaporation speed of the liquid phase, low evaporation efficiency thereof, and failure to be discharged in time, thereby ensuring the stable operation of the system.

A pH detection device and a phosphoric acid titration device are further provided in each of the first evaporation chamber (41), the second evaporation chamber (42) and the third evaporation chamber (43), wherein the phosphoric acid titration device is used for feeding excess phosphoric acid to the above evaporation chambers, and the pH detection device is used to determine the end point of the pH value of the liquid phase adjusted by the third evaporation chamber (43), such that the pH value of the liquid phase is between 4 and 4.2.

The third evaporation chamber (43) is connected to the neutralization reactor (1). A filter device (44) is further provided at each of the discharge ports of the first evaporation chamber (41), the second evaporation chamber (42), and the third evaporation chamber (43), which is used for removing the colloidal precipitates generated during the concentration and boiling of the liquid phase, such as MgHPO4, CaHPO4, etc. After these colloidal precipitates are filtered, the cationic impurities accumulated in the process of the present application are further reduced, the purity of the product is improved, and the enrichment of impurities due to the recycling of the liquid phase is avoided.

The components or element content of the potassium dihydrogen phosphate prepared from the liquid phase filtered by the concentration system and the potassium dihydrogen phosphate prepared from the liquid phase unfiltered by the concentration system are analyzed respectively, and the resulted mass fractions of the main components are as follows:

|  |  | Potassium dihydrogen phosphate ($\omega$) | MgHPO4 ($\omega$) | CaHPO4 ($\omega$) | Fe ($\omega$) | As ($\omega$) |
|---|---|---|---|---|---|---|
| Filtered | Trial production for 1 day | 99.94% | 0.002% | 0.002% | 0.0017% | 0.0032% |
|  | Trial production for 5 days | 99.85% | 0.002% | 0.002% | 0.0014% | 0.0034% |
|  | Trial production for 10 days | 99.93% | 0.003% | 0.004% | 0.0015% | 0.0039% |
| Unfiltered | Trial production for 1 day | 99.43% | 0.003% | 0.003% | 0.0015% | 0.0036% |
|  | Trial production for 5 days | 98.82% | 0.010% | 0.042% | 0.0054% | 0.0038% |
|  | Trial production for 10 days | 97.65% | 0.023% | 0.11% | 0.0093% | 0.0035% |

In addition, the potassium dihydrogen phosphate crystals are discharged out via the hopper after being dried in the fluidized bed (3), and then fed to a stock bin through a distribution device in which an electromagnet (5) for removing the magnetic metal powder inevitably mixed in the entire system from the material is provided, thereby further improving the quality of the product.

The above description only illustrates preferred embodiments of the present application, and it should be noted that the above preferred embodiments should not be regarded as a limitation to the present application, and the protection scope of the present application should be defined by the claims. For those of ordinary skill in the art, several improvements and modifications may be made without departing from the spirit and scope of the present application, and these improvements and modifications are also deemed to fall within the protection scope of the present application.

The invention claimed is:

1. A preparation process of food-grade potassium dihydrogen phosphate, comprising:
   step 1, feeding phosphoric acid and a potassium hydroxide solution into a neutralization reactor (1) for a neutralization reaction to obtain a potassium dihydrogen phosphate solution;

step 2, cooling the potassium dihydrogen phosphate solution to 40-45° C. to obtain a potassium dihydrogen phosphate suspension;

step 3, separating the potassium dihydrogen phosphate suspension to obtain a liquid phase and a solid phase;

step 4, feeding the liquid phase to a concentration system for concentration and then feeding to the neutralization reactor (1); and step 5, drying the solid phase to obtain potassium dihydrogen phosphate crystals;

wherein in step 1, the potassium dihydrogen phosphate solution is obtained by a method comprising:

heating a phosphoric acid with a concentration of not less than 85% to 100-105° C.; and feeding the heated phosphoric acid into the neutralization reactor (1) and feeding a potassium hydroxide solution with a concentration of 48-50% continuously at a constant speed into the neutralization reactor (1), in which the phosphoric acid is fully reacted with the potassium hydroxide under continuous stirring to obtain the potassium dihydrogen phosphate solution;

in step 2, the potassium dihydrogen phosphate suspension is obtained by a method comprising:

cooling the potassium dihydrogen phosphate solution to 40-45° C. at a speed of 0.3-0.45° C./min in the neutralization reactor (1) by continuously stirring the potassium dihydrogen phosphate solution therein to obtain the potassium dihydrogen phosphate suspension;

and in step 3, the potassium dihydrogen phosphate suspension is separated into the liquid phase and the solid phase by a centrifuge (2), which has a steam pipeline (21) which introduces saturated steam into the centrifuge (2), and a potassium hydroxide solution pipeline (22) for introducing a potassium hydroxide solution with a concentration of 48-50% into the centrifuge (2), and a discharge pipeline is further provided on the centrifuge (2).

2. The preparation process of food-grade potassium dihydrogen phosphate according to claim 1, wherein a stirring device is provided in the neutralization reactor (1), and a two-stage stirring blade (13) is at least arranged along an axial direction on a stirring shaft of the stirring device, and wherein the stirring device performs the continuous stirring.

3. The preparation process of food-grade potassium dihydrogen phosphate according to claim 2, wherein the stirring device is connected with a variable-frequency drive device (11), and the neutralization reactor (1) is provided with a temperature detection device (12), with the variable-frequency drive device (11) being electrically connected to the temperature detection device (12), wherein the temperature detection device (12) is used for detecting the real-time temperature change of the neutralized solution within the neutralization reactor (1), and the variable-frequency drive device (11) is used for adjusting the stirring speed depending on the detection result of the temperature detection device (12), such that the temperature of the solution within the neutralization reactor (1) is 85-100° C.

4. The preparation process of food-grade potassium dihydrogen phosphate according to claim 1, wherein the concentration system comprises a first evaporation chamber (41), a second evaporation chamber (42) and a third evaporation chamber (43), wherein a shell side of the first evaporation chamber (41) is connected with a first steam pipeline, a shell side of the second evaporation chamber (42) and a shell side of the third evaporation chamber (43) are connected in series with a second steam pipeline.

5. The preparation process of food-grade potassium dihydrogen phosphate according to claim 4, wherein the liquid phase is heated and evaporated in the first evaporation chamber (41), the second evaporation chamber (42) and the third evaporation chamber (43) in sequence, such that the liquid phase with a density of 1.3 to 1.5 g/mL at normal temperature and pressure is concentrated to a mixed solution having specific gravity of 1.5-1.55 g/mL, 1.55-1.58 g/mL and 1.58-1.63 g/mL respectively.

6. The preparation process of food-grade potassium dihydrogen phosphate according to claim 4, wherein a steam introduced by the first steam pipeline is used for heating the first evaporation chamber (41) to 100-110° C., a steam introduced within the second evaporation chamber (42) heats the second evaporation chamber (42) to 80-90° C., and a steam introduced within the third evaporation chamber (43) heats the third evaporation chamber (43) to 65-75° C.

7. The preparation process of food-grade potassium dihydrogen phosphate according to claim 4, wherein a filter device (44) is provided at each discharge port of the first evaporation chamber (41), the second evaporation chamber (42) and the third evaporation chamber (43).

* * * * *